(12) United States Patent
Bozzo et al.

(10) Patent No.: US 8,661,738 B2
(45) Date of Patent: Mar. 4, 2014

(54) DOOR FRAME ASSEMBLY AND METHOD

(75) Inventors: Trent Bozzo, Dublin, OH (US); Kozo Kusumoto, Dublin, OH (US); Kenichi Kitayama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 906 days.

(21) Appl. No.: 12/635,237

(22) Filed: Dec. 10, 2009

(65) Prior Publication Data

US 2011/0138693 A1 Jun. 16, 2011

(51) Int. Cl.
*B60J 5/04* (2006.01)
(52) U.S. Cl.
USPC .......................... 49/502; 49/349; 296/146.7
(58) Field of Classification Search
USPC ........ 296/146.1, 146.5, 146.6, 146.7; 49/348, 49/349, 350, 351, 502
See application file for complete search history.

(56) References Cited

U.S. PATENT DOCUMENTS

| 2,650,857 | A | * | 9/1953 | Watter et al. .................... 49/502 |
| 4,648,208 | A | | 3/1987 | Baldamus et al. |
| 4,712,351 | A | * | 12/1987 | Kasprzak .................... 52/573.1 |
| 4,845,894 | A | | 7/1989 | Herringshaw et al. |
| 5,595,328 | A | | 1/1997 | Safabakhsh et al. |
| 5,902,004 | A | | 5/1999 | Waltz et al. |
| 6,231,112 | B1 | * | 5/2001 | Fukumoto et al. ......... 296/146.5 |
| 6,399,179 | B1 | | 6/2002 | Hanrahan et al. |
| 7,059,657 | B2 | * | 6/2006 | Bodin et al. ................ 296/146.6 |
| 7,159,926 | B2 | | 1/2007 | Ward et al. |
| 2007/0039245 | A1 | | 2/2007 | Buchta et al. |
| 2007/0120394 | A1 | | 5/2007 | Nakamori et al. |

FOREIGN PATENT DOCUMENTS

JP 5178090 7/1993

OTHER PUBLICATIONS

International Search Report of PCT/US10/58056 dated Mar. 9, 2011.
Written Opinion of PCT/US10/58056 dated Mar. 9, 2011.

* cited by examiner

*Primary Examiner* — Katherine Mitchell
*Assistant Examiner* — Catherine A Kelly
(74) *Attorney, Agent, or Firm* — Rankin, Hall & Clark LLP

(57) ABSTRACT

A door frame for a vehicle includes a door frame, a window regulator mounted to the door frame for opening and closing a window pane, and a door lining mounted to the door frame. A plurality of mounting apertures is defined in the door frame, including at least one first mounting aperture for mounting the window regulator and at least one second mounting aperture for mounting the door lining. An isolating aperture is defined in the door frame between the at least one first aperture and the at least one second aperture for isolating the at least one second aperture from the at least one first aperture to thereby reduce lateral forces imparted to the door frame from the window regulator from transferring to the door lining.

14 Claims, 6 Drawing Sheets

DOOR FRAME ASSEMBLY AND METHOD

BACKGROUND

The present disclosure generally relates to door frame assemblies for vehicles, and particularly relates to improved door assembly and method that minimizes lateral deflection of a door lining.

A conventional door assembly includes a window regulator and a door lining, both mounted to a door mounting structure. The window regulator opens and closes a window pane within a sash attached to and/or partially formed by the door mounting structure. One longstanding problem in such door assemblies is perceived abnormal movement of the door lining during up/down operation of the door window. In particular, during operation of the window via the regulator, the door lining can move (e.g., breathe or vibrate) in a manner that may, at least from the customer's viewpoint, seem unusual or give the feeling of weakness or poor quality.

The problem typically relates to the window pane reaching its full stroke (i.e., either completely closed or completely open). Specifically, the window regulator can transmit a force directed toward an interior of the vehicle cabin on the regulator mounting structure (e.g., a portion of the door mounting structure). This force can cause a temporary deflection in the mounting structure which, when the door lining is attached to the same structure, can cause the door lining to visibly move. This problem is often accentuated when the window regulator is an X-type regulator. This is sometimes due to the portion of the mounting structure for the regulator being positioned very near the portion of the mounting structure used for mounting the door lining.

One current technology employed for dealing with the problem of the door lining moving laterally during window up/down operation is to strengthen the regulator mounting structure to minimize deflection of the door lining. This can include adding a stiffening shape to the mounting structure, such as a raised rib or embossment. Alternatively, or in addition, the material of the mounting structure can be changed to impart strength thereto (e.g., a stronger material can be used, the material thickness can be increased, etc.). Still further, separate members (e.g., steel stiffeners) can be added to the mounting structure. Another current technology attempting to address the problem of the door lining undesirably moving is to optimize the mounting point of the door lining, particularly those proximate to the mounting points of the window regulator. For example, the door lining mounting points can be moved apart as far as possible from the regulator mounting points so that deflection of the mounting structure transmitted to the door liner is minimized. Unfortunately, this often is very difficult due to layout limitations.

SUMMARY

According to one aspect, a door frame assembly for a vehicle that can overcome the aforementioned shortcomings includes a doorframe, a window regulator mounted to the door frame for opening and closing a window pane, and door lining mounted to the door frame. A plurality of mounting apertures is defined in the door frame, including at least one first mounting aperture for mounting the window regulator and at least one second mounting aperture for mounting the door lining. An isolating aperture is defined in the door frame between the at least one first aperture and the at least one second aperture for isolating the at least one second aperture from the at least one first aperture to thereby reduce lateral forces imparted to the door frame from the window regulator from transferring to the door lining.

According to another aspect, a vehicle door assembly includes a door mounting structure having a window regulator mounted thereto. A door lining is also mounted to the door mounting structure. At least one first mounting aperture for mounting the window regulator to the door mounting structure and at least one second mounting aperture for mounting the door lining to the door mounting structure are defined in the door mounting structure. An elongated isolating aperture is also defined through the door mounting structure between the at least one first mounting aperture and the at least one second mounting aperture for isolating lateral movement of the door mounting structure imparted thereto from the window regulator.

According to still another aspect, a method of mounting a door lining to a door mounting structure of a vehicle door assembly is provided. In the method according to this aspect, the door mounting structure is provided with at least one first aperture defined therein for mounting a window regulator and at least one second aperture defined therein for mounting the door lining. An elongated isolating aperture is provided through the door mounting structure at a location disposed between the at least one first mounting aperture and the at least one second mounting. The window regulator is mounted to the door mounting structure via the at least one first aperture. The door lining is mounted to the door mounting structure via the at least one second mounting aperture.

DETAILED DESCRIPTION

Figure 1:
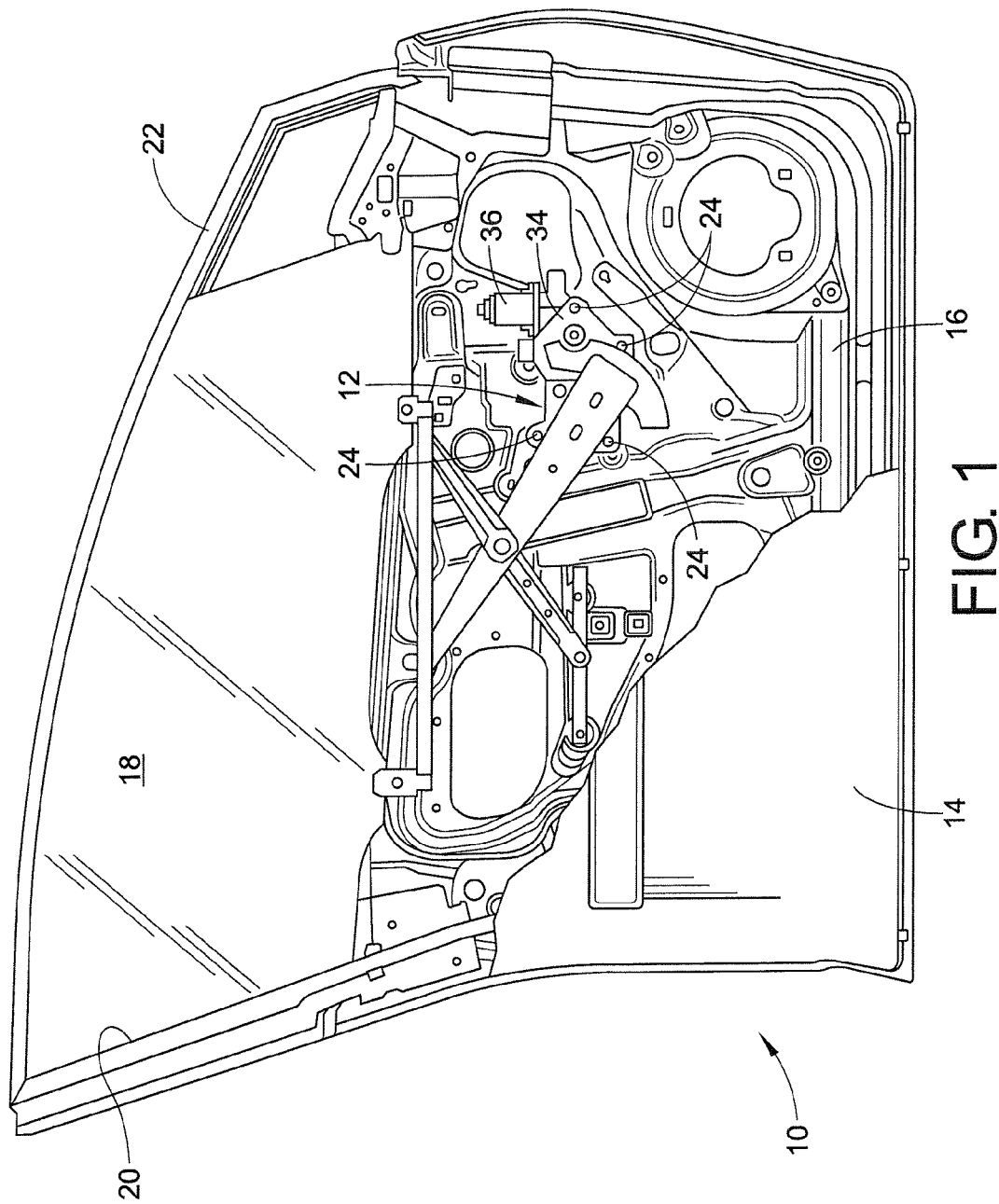
FIG. 1 is an elevation view of a door frame assembly for a vehicle having a window regulator and a door lining, both mounted to a door frame according to an exemplary embodiment.
Figure 2:
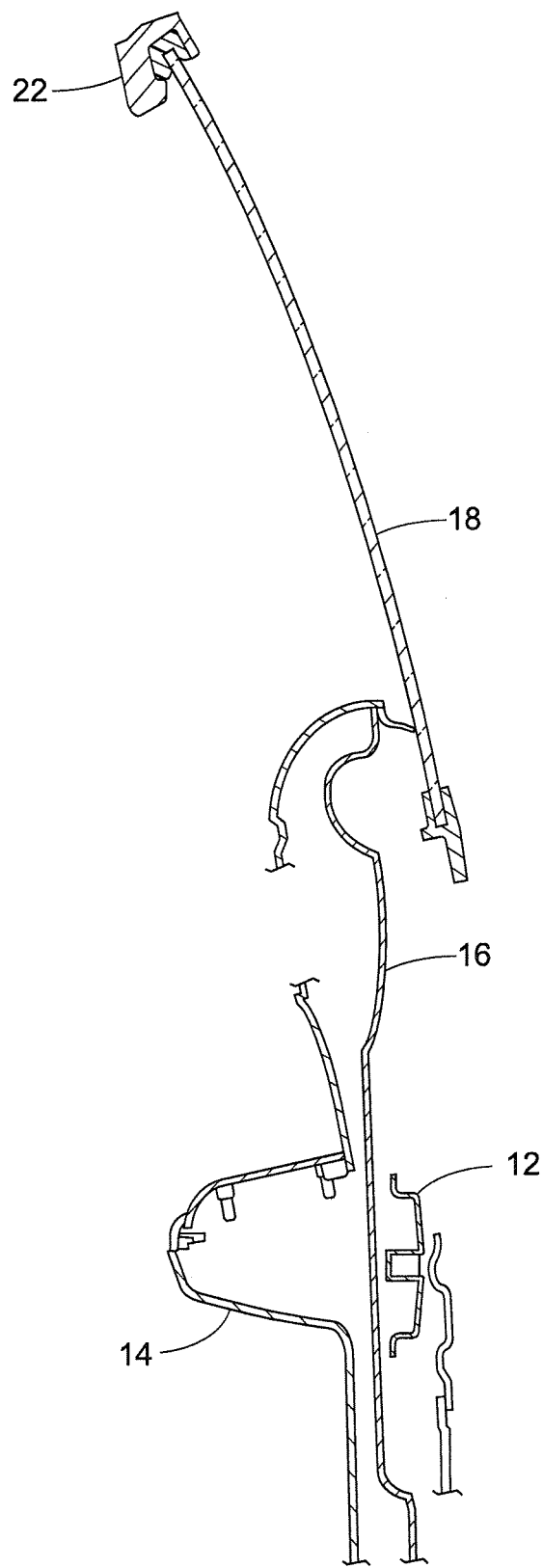
FIG. 2 is a cross sectional view of the door frame assembly of FIG. 1.

FIGS. 1 and 2 illustrate a door frame assembly 10 for a vehicle including a window regulator 12 and a door lining 14, both mounted to a door frame or door mounting structure 16. As is known and understood by those skilled in the art, the window regulator 12 opens and closes a window pane 18 within a window opening 20 framed by the door frame 16 and a door sash structure 22 attached to or formed integrally with the door frame.

Figure 3:
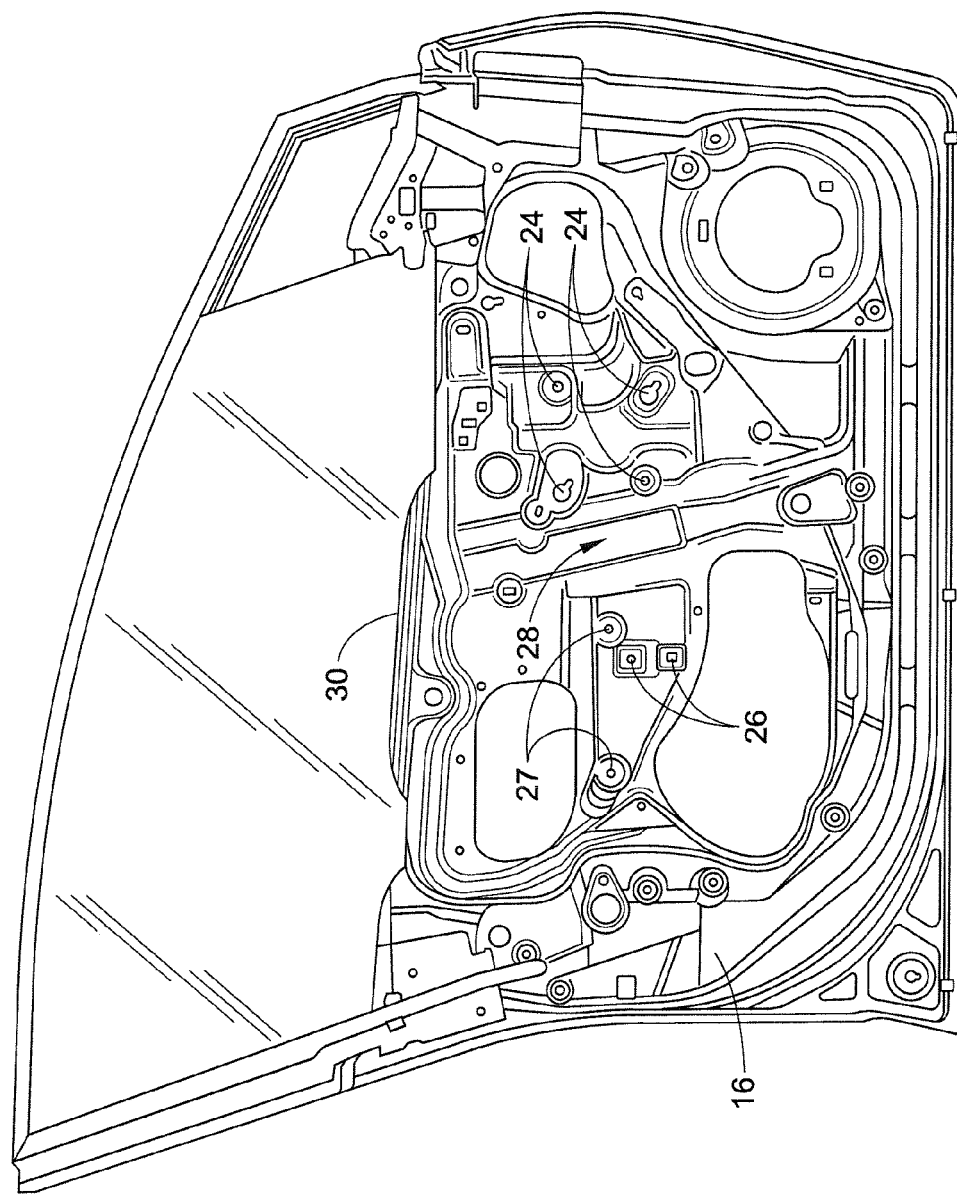
FIG. 3 is another elevation view of the door frame assembly of FIG. 1 shown with the window regulator and the door lining removed.

With additional reference to FIG. 3, a plurality of mounting apertures are defined in the door frame 16, including a first set of apertures 24 for mounting the window regulator 12 and a second set of apertures 26 for mounting the door lining 14. Additional apertures (e.g., apertures 27) can be provided for mounting other components of the window regulator to the door frame 16. To prevent abnormal lateral movement of the door lining during operation of the window regulator 12, the door frame 16 includes a stiffening shape or portion 28. In the illustrated embodiment, the stiffening shape 28 is a raised portion of the door frame 16, such as a raised rib or embossment. The illustrated stiffening shape 28 extends longitudinally from an upper side or edge 30 of the door frame 16 down toward a lower side or edge 32 of the door frame 16. The stiffening shape 28 strengthens the door frame 16, particularly at and near the location of the stiffening shape 28. This can advantageously prevent or limit the door lining 14 from moving abnormally (i.e., laterally inwardly) during up/down operation of the window pane 18 by the regulator 12. In other words, deflection of the door lining 14 can be reduced or minimized as relates to the window regulator 12.

As shown in FIG. 1, the regulator 12 can be an X-type regulator, which includes a main portion or bracket 34 to which a motor 36 of the regulator 12 is mounted. This type of regulator 12 uses a large number of mounting apertures to secure the main bracket 34 to the door frame 16. For example, in the illustrated embodiment, at least four apertures are used to secure the main bracket 34 to the door frame 16, though other numbers of apertures could be used. Absent the stiffening shape 28, the window regulator 12 can transmit a force directed laterally inwardly relative to the door frame 16 when in its closed position on a vehicle and such force is transmitted to the door frame 16. This can travel along the door frame 16 to the adjacent door lining mounting apertures 26, which can cause the door lining 14 to visibly move.

Figure 4:
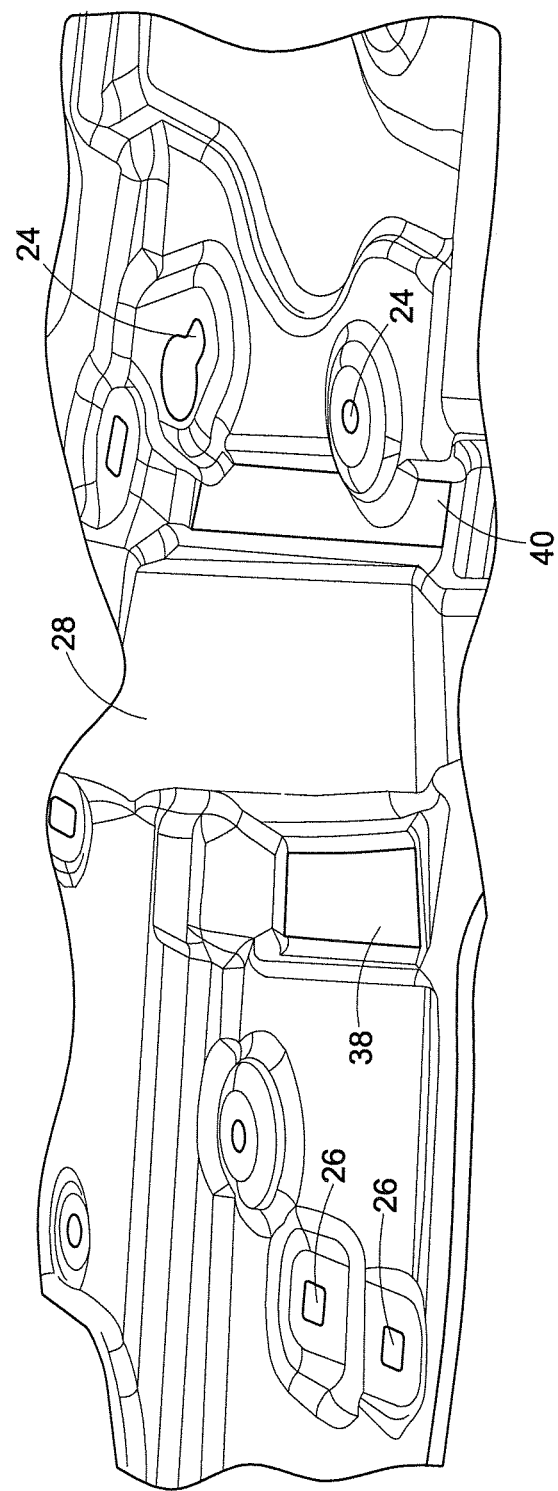
FIG. 4 is a partial perspective view of a door frame or mounting structure of the door frame assembly.

With additional reference to FIG. 4, additional or auxiliary stiffening shapes 38, 40 can be added to the door frame 16. As shown in the illustrated embodiment, these additional stiffening shapes 38, 40 can flank the main stiffening shape 28. In particular, the stiffening shape 38 can be positioned between the stiffening shape 28 and the apertures 26 for mounting the door lining 14. The stiffening shape 40 can be positioned between the stiffening shape 28 and the adjacent apertures 24 for mounting the regulator 12. The stiffening shapes 38, 40 can have a shorter elongation than the stiffening shape 28 and can have a direction of embossment reversed relative to the stiffening shape 28. That is, the stiffening shape 28 can project laterally inwardly relative to a vehicle on which the door frame assembly 10 is mounted and the stiffening shapes 38, 40 can project laterally outwardly relative to the same vehicle.

Figure 5:
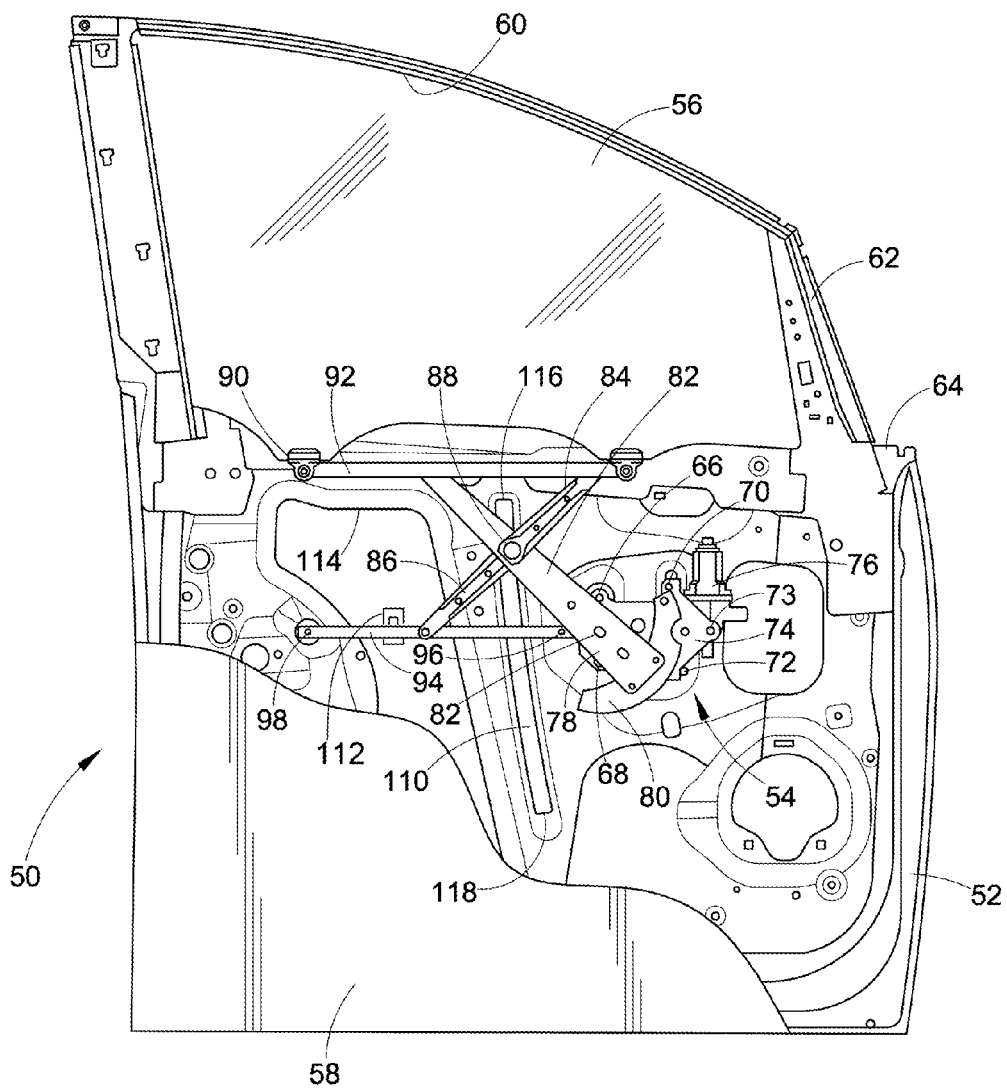
FIG. 5 is an elevation view of a door frame assembly for a vehicle having a window regulator and a door lining, both mounted to a door frame according to another exemplary embodiment.
Figure 6:
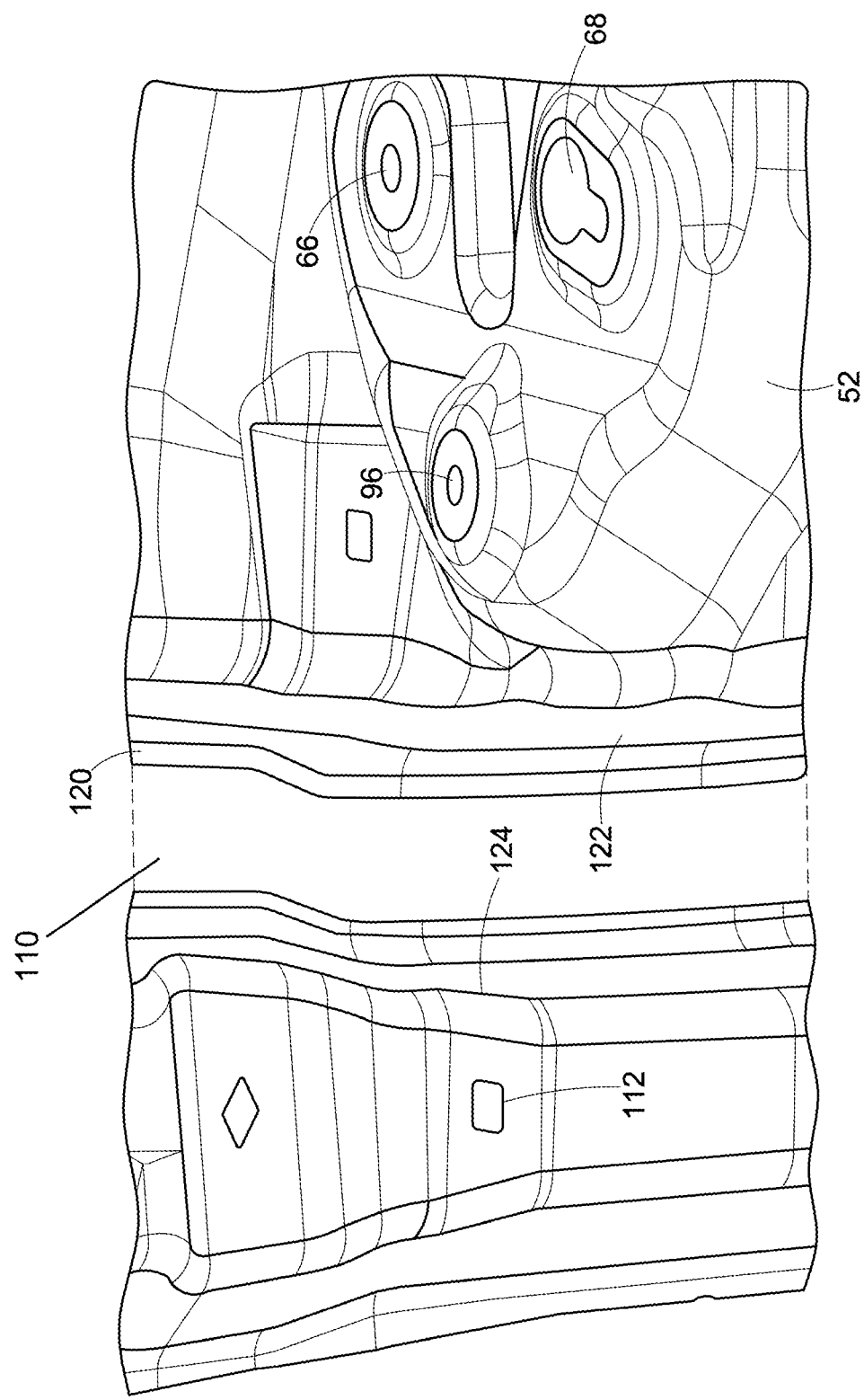
FIG. 6 is a partial perspective view of the door frame or mounting structure showing an isolating aperture defined therein.

With reference to FIGS. 5 and 6, a door frame assembly 50 for a vehicle is illustrated according to another exemplary embodiment. The illustrated door frame assembly 50 includes a vehicle door frame or door mounting structure 52, a window regulator 54 mounted to the door frame 52 for opening and closing of window pane 56, and door lining 58 mounted to the door frame 52. The window regulator 54 moves the window pane 56 up and down within a window opening 60, which is framed at least in part by a door sash structure 62. The door sash structure 62 can be formed as part of the door frame 52 (or can be attached thereto) along an upper side or edge 64 of the door frame 52. A lower portion of the window opening 60 can be defined by the door sash structure 62 and/or the upper side or edge 64 of the door frame 52.

The vehicle door frame assembly 50 of the illustrated embodiment can additionally include a plurality of mounting apertures defined in the door frame 52, including at least one first mounting aperture for mounting the window regulator 54 to the door frame 52 and at least one second mounting aperture for mounting the door lining 58 to the door frame 52. In the illustrated embodiment, the at least one first mounting aperture includes a plurality of closely spaced apertures 66, 68, 70, 72 that are grouped together to secure the window regulator 54, and particularly a base plate 74 thereof, to the door frame 52. In the illustrated embodiment, the window regulator 54 is an X-type window regulator having a motor 76 supported or mounted to the base plate 74 via aperture 73 for driving the window pane 56. Accordingly, the motor 76 is primarily mounted to the door frame 52 by the apertures 66-72 and transmission of lateral forces from the motor 76 to the door frame 52 tends to occur at or adjacent the apertures 66-72.

The illustrated window regulator 54 additionally includes a main lift arm 78 that is driven by the motor 76 for moving the pane 56 in downward and upward directions when the motor 74 rotates the main lift arm 78 in opposite directions to effect opening and closing of the window opening 60. The main lift arm 78 can include a sector gear portion or plate 80 at one end thereof that can be driven by the motor 74 to rotate the main lift arm 78 about pivot 82. As is known and understood by those skilled in the art (and thus not illustrated herein), the sector gear portion 80 has gear teeth meshingly engaged with driving teeth of the motor 76 or a drive mechanism or gear train connected operatively thereto. In one example, appropriate reduction gears can be employed between the motor 76 and the sector gear portion 80.

The illustrated regulator 54 additionally includes first and second sub-arms 84, 86 pivotally connected to the main lift arm 80 at floating pivot 88 (i.e., pivot 88 is not fixedly connected to the door frame 52, but instead floats relative to the door frame as the window regulator 54 opens and closes the window pain 56). In particular, the first sub-arm 84 and the main lift arm 78 have respective ends pivotally connected to a lower end 90 of the window pane 56. In one exemplary embodiment, these ends of the arms 78, 84 are slidably disposed within a track member 92, which is itself securely connected to the lower end 90 of window pane 56, such as by suitable brackets and/or fasteners. An opposite end of the first sub-arm 84 is connected to the main lift arm 78 at the floating pivot 88.

One end of the second sub arm 86 is also connected to the main lift arm 78 at the floating pivot 88 and a opposite end is pivotally connected to the door frame 52 at a vertically fixed location via track member 94, along which the end of the second sub-arm 86 is slidably moveable. The lower track member 94 is secured to the door frame 52 at one end via mounting aperture 96 defined in the door frame 52. The mounting aperture 96 can be grouped together with or considered as part of the plurality of closely spaced apertures 66-72 used to mount the base plate 74 to the door frame 52, though this is not required. The other end of the lower track member can be secured to the door frame 52 via mounting aperture 98.

An elongated isolating aperture 110 is defined in and through the door frame 52 between the at least one first aperture (e.g., the plurality of closely spaced apertures, 66, 68, 70, 72) and the at least one second aperture (e.g., aperture 112 that mounts the door lining 58 to the door frame 52) for insulating the at least one second aperture of the door lining 58 from the plurality of closely spaced apertures 66-72 to thereby reduce lateral forces imparted to the door frame 52 from the window regulator 54 from transferring through the door frame 52 to the door lining 58, particularly via the mounting location provided by the aperture 112. In the illustrated embodiment, the isolating aperture 110 is a vertically elongated slot that longitudinally (i.e., longitudinal relative to a vehicle on which the door frame 52 is mounted) separates the plurality of closely spaced aperture 66-72 and the aperture 112.

In the illustrated embodiment, the isolating aperture 110 has an upper end 116 located adjacent an upper end 64 of the door frame 52 that defines the window opening 60 (and is spaced closely adjacent thereto) and has a lower end 118 located vertically below the plurality of closely spaced apertures 66-72. Accordingly, in the illustrated embodiment, the isolating aperture 110 is elongated from its upper end 116 to its lower end 118. Thus, the isolating aperture 110 extends through the door frame 52 at least along an elongated height thereof. In particular, the isolating aperture 110 is vertically elongated to separate the mounting apertures 66-72 and the door lining aperture 112 from one another along a longitudinal length of the vehicle. By this configuration, the base plate 74 of the window regulator 54 is mounted via the apertures 66-72 on one side of the isolating aperture 110, whereas the aperture 112 is disposed on an opposite side of the isolating aperture 110.

Another isolating aperture 114 can be defined in the door frame 52 between the door lining aperture 112 and the aperture 98 at which one end of the lower track member 94 is secured to the door frame 52. This separates the mounting location 98 of the lower track member 94 from the door lining aperture 112 since these apertures 98 and 112 are both provided on an opposite side of the isolating aperture 110 than the plurality of closely spaced apertures 66-72. The isolating aperture 110 can additionally serve to isolate the aperture 96 corresponding to the lower track member 94 from the door lining aperture 112.

Advantageously, the isolating aperture 110 can limit lateral movement of the door lining 58 by isolating it from the door regulator mounting area (i.e., the plurality of closely spaced apertures 66-72 and 96). Accordingly, even if the portion of the door frame 52 immediately adjacent the plurality of closely spaced apertures 66-72 (or aperture 96) moves slightly laterally, this movement is not transmitted to the location of the door lining aperture 112 due to the isolating aperture 110. As a result, the door lining 110 can be limited from moving more than about 1.5 mm with limited additional cost and a negligible or negative weight impact (i.e., no increase in material thickness is required, no additional stiffeners). In addition, a minimal amount of weight is removed from the door frame 52 reducing the weight of the assembly 50 and layout flexibility is maintained (i.e., the location of the door lining mounting locations, such as the aperture 112, remains flexible).

If desired, stiffening shapes can be included in the door frame assembly 50. For example, a main stiffening shape 120 in the form of an elongated raised rib or embossment can be provided at or along the door frame 52 where the isolating aperture 110 is defined (i.e., between the at least one first aperture and the at least one second aperture). In this arrangement, the isolating aperture can be defined in the stiffening shape 120 and particularly within a raised portion thereof. Auxiliary stiffening shapes, also in the form of embossments or ribs 122, 124, can also be provided flanking the main stiffening shape 120. For example, in the illustrated embodiment, the main stiffening shape 120 can be formed as a rib projecting laterally inwardly (i.e., in a first direction) and the auxiliary stiffening shapes 122, 124 can be provided as depressions which extend laterally outwardly on the door frame (i.e., in a second, opposite direction). These can further facilitate isolation of the door lining apertures, such as aperture 112, from a main mounting location of the window regulator 54 (i.e., an area adjacent and surrounding the plurality of closely spaced apertures 66-72).

A method of mounting a door lining to a door mounting structure of a vehicle door assembly will now be described. In exemplary embodiment, door mounting structure or frame 52 can be provided with at least one first aperture defined therein (e.g., apertures 66-72) for mounting window regulator 54 to the door frame 52 and at least one second aperture (e.g., door lining aperture 112) can be defined therein for mounting door lining 58 to the door frame 52. The elongated isolating aperture 110 can be provided through the door frame 52 at a location disposed between the at least one first aperture and the at least one second aperture. Next, the window regulator 54 can be mounted to the door frame 52 via the apertures 66-72. The door lining 58 can also be mounted to the door frame 52 via the at least one second mounting aperture, which can include the door lining aperture 112. As already described herein, the provision of the elongated isolating aperture 110 can include providing the aperture as a vertically elongated slot in the door frame 52 that isolates the at least one second aperture 112 from the at least one first aperture 66-72. Accordingly, providing the isolating aperture 110 can include positioning the aperture 110 so that an upper end 116 thereof is located adjacent the upper end 64 of the door frame 52 that defines a lower portion of the window opening 60.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A door frame assembly for a vehicle, comprising:
a one-piece door frame having a height defined by an upper end and a lower end;
a window regulator mounted to said door frame for opening and closing a window pane;
an interior door lining mounted to said door frame;
a plurality of mounting apertures defined in said door frame, including at least one first mounting aperture for mounting said window regulator and at least one second mounting aperture for mounting said door lining; and
an isolating aperture defined generally centrally in said door frame between said at least one first aperture and said at least one second aperture isolating said at least one second aperture from said at least one first aperture thereby reducing lateral forces imparted to said door frame from said window regulator from transferring to said door lining,
wherein said at least one first mounting aperture includes a plurality of closely spaced first mounting apertures that secure said window regulator to said door frame, and said isolating aperture is a vertically elongated slot that longitudinally separates each first mounting aperture of said plurality of closely spaced mounting apertures and said at least one second aperture, said isolating aperture has an upper end located vertically above said at least one first mounting aperture and adjacent the upper end of said door frame that defines said lower window sash opening, and the lower end located vertically below said at least one first mounting aperture such that the isolating aperture extends a majority of the height of the door frame,
wherein said at least one second mounting aperture is located inwardly from a peripheral edge portion of said door frame and is located adjacent to said isolating aperture.

2. The door frame assembly of claim 1 wherein said plurality of closely spaced first mounting apertures are located on one side of said isolating aperture and secure a base plate of said window regulator to said door frame.

3. The door frame assembly of claim 2 wherein said window regulator is an x-type window regulator having a motor mounted to said base plate for driving the window pane.

4. The door frame assembly of claim 3 wherein a lower track member of said x-type window regulator is mounted on another, opposite side of said isolating aperture.

5. The door frame assembly of claim 4 wherein another isolating aperture is defined in said door frame between a mounting location for said lower track member and said at least one second mounting aperture.

6. The door frame assembly of claim 1 wherein said isolating aperture is elongated in a vertical direction from said upper end to said lower end.

7. The door frame assembly of claim 1 wherein said isolating aperture limits lateral movement of said door lining to less than 1.5 mm.

8. The door frame assembly of claim 1 wherein said isolating aperture extends through said door frame at least along an elongated height of said isolating aperture.

9. The door frame assembly of claim 1 wherein said door frame includes a main stiffening shape between said at least one first aperture and said at least one second aperture for strengthening said door frame, said isolating aperture defined in said stiffening shape.

10. The door frame assembly of claim 9 wherein said stiffening shape is an elongated raised rib and said isolating aperture is defined in a raised portion of said raised rib.

11. The door frame assembly of claim 9 wherein said door frame further includes auxiliary stiffening shapes flanking said stiffening shape, said main stiffening shape projecting laterally from said door frame in a first direction and said auxiliary stiffening shapes projecting laterally from said door frame in a second, opposite direction.

12. A vehicle door assembly, comprising:
a one-piece door mounting structure that defines a lower window sash opening and having a window regulator mounted thereto, wherein the one-piece door mounting structure has a height defined by the lower sash and a lower end;
an interior door lining mounted to said door mounting structure;
a plurality of closely spaced first mounting apertures for mounting said window regulator to said door mounting structure and at least one second mounting aperture for mounting said door lining to said door mounting structure are defined in said door mounting structure, each first mounting aperture of said plurality of said first mounting apertures and said at least one second mounting aperture being generally centrally located on said door mounting structure; and
an isolating aperture defined through said door mounting structure between said plurality of first mounting apertures and said at least one second mounting aperture that isolates lateral movement of said door mounting structure imparted thereto from said window regulator, said isolating aperture elongated along a height of a vehicle relative to a longitudinal length of the vehicle such that the isolating aperture extends a majority of the height of the one-piece door mounting structure,
wherein said elongated isolating aperture separates said plurality of first mounting apertures from said at least one second mounting aperture along the longitudinal length of the vehicle such that said plurality of first mounting apertures is located on one side of said elongated isolating aperture and said at least one second mounting aperture is located an opposite side of said elongated isolating aperture.

13. The vehicle door assembly of claim 12 wherein an upper end of said elongated isolating aperture is spaced closely adjacent the window opening disposed above said door mounting structure.

14. The door frame assembly of claim 1 wherein said interior door lining is mounted directly to said door frame.

* * * * *